US012464619B2

(12) United States Patent
Galvano et al.

(10) Patent No.: US 12,464,619 B2
(45) Date of Patent: Nov. 4, 2025

(54) LIGHT EMITTING DIODE (LED) CURRENT REGULATOR CIRCUIT WITH MULTIPLE LED PINS FOR ROBUST CONTROL OF LED CHAIN

(71) Applicant: Infineon Technologies AG

(72) Inventors: Maurizio Galvano, Padua (IT); Mattia Montoncelli, Abano Terme (IT); Enrico Tonazzo, Villanova di Camposampiero (IT); Yoshinori Imanaka, Yokohama (JP)

(73) Assignee: Infineon Technologies AG, Neubiberg (DE)

(*) Notice: Subject to any disclaimer, the term of this patent is extended or adjusted under 35 U.S.C. 154(b) by 218 days.

(21) Appl. No.: 18/311,022

(22) Filed: May 2, 2023

(65) Prior Publication Data

US 2024/0373530 A1 Nov. 7, 2024

(51) Int. Cl.
H05B 45/44 (2020.01)
(52) U.S. Cl.
CPC .................. H05B 45/44 (2020.01)
(58) Field of Classification Search
CPC .................. H05B 45/395; H05B 45/44–48
See application file for complete search history.

(56) References Cited

U.S. PATENT DOCUMENTS

| 8,400,081 | B2 | 3/2013 | Catalano et al. |
| 8,963,431 | B2 | 2/2015 | van den Berg et al. |
| 9,468,051 | B1 | 10/2016 | Lin et al. |
| 9,781,788 | B1 | 10/2017 | Cortigiani et al. |
| 9,835,668 | B2 | 12/2017 | Kriebernegg |
| 10,004,118 | B1* | 6/2018 | Mi .................. H05B 45/48 |
| 10,136,496 | B2 | 11/2018 | Sudhaus |
| 10,542,593 | B1 | 1/2020 | Mignoli et al. |
| 11,523,484 | B2 | 12/2022 | Mignoli et al. |
| 2007/0188425 | A1 | 8/2007 | Saccomanno |
| 2007/0257645 | A1 | 11/2007 | Nishino |
| 2010/0207543 | A1 | 8/2010 | Crawford et al. |
| 2010/0315019 | A1 | 12/2010 | Hoogzaad et al. |

(Continued)

FOREIGN PATENT DOCUMENTS

WO 2012063141 A1 5/2012
WO WO-2021206145 A1 * 10/2021

OTHER PUBLICATIONS

Translation of WO 2021206145 A1 (Year: 2021).*

(Continued)

Primary Examiner — Renan Luque
(74) Attorney, Agent, or Firm — Shumaker & Sieffert, P.A.

(57) ABSTRACT

In some examples, this disclosure describes a method of operating a circuit for delivering current to a plurality of light emitting diodes (LEDs) arranged in series. The method may comprise delivering a first current to the plurality of LEDs through the first LED pin and over a first current path through the circuit; delivering a second current to the subset of the plurality of LEDs through the second LED pin and over a second current path through the circuit; and regulating a sum of the first current and the second current, wherein the second current path is in parallel with the first current path in the circuit, and wherein the sum of the first current and the second current is regulated based on a sensed current through the circuit.

15 Claims, 7 Drawing Sheets

(56) References Cited

U.S. PATENT DOCUMENTS

| | | |
|---|---|---|
| 2011/0199003 A1 | 8/2011 | Muguruma et al. |
| 2012/0038615 A1* | 2/2012 | Leung ................. H05B 45/395 |
| | | 345/82 |
| 2013/0088174 A1 | 4/2013 | Yagi et al. |
| 2013/0127353 A1 | 5/2013 | Athalye et al. |
| 2013/0257279 A1 | 10/2013 | Le |
| 2014/0241387 A1 | 8/2014 | Ortiz |
| 2015/0022112 A1 | 1/2015 | Nietfeld |
| 2015/0245433 A1 | 8/2015 | McCune, Jr. |
| 2016/0205742 A1 | 7/2016 | Seki et al. |
| 2016/0219670 A1 | 7/2016 | Sudhaus |
| 2017/0367155 A1 | 12/2017 | Cortigiani et al. |
| 2018/0184490 A1* | 6/2018 | Ido ........................ H05B 45/44 |
| 2018/0352622 A1 | 12/2018 | Ng |
| 2019/0364625 A1 | 11/2019 | Brower |
| 2021/0014948 A1* | 1/2021 | Sengodan .............. H05B 45/46 |

OTHER PUBLICATIONS

"Infineon® LITIX™ Basic Driver Family, Multichannel Solutions for N-1, Open Load & Short Circuit Detection," Infineon, Application Note, Automotive Power, V1.1, Mar. 27, 2015, 65 pp.

U.S. Appl. No. 17/806,396, filed Jun. 10, 2022, naming inventors Montoncelli et al.

* cited by examiner

LIGHT EMITTING DIODE (LED) CURRENT REGULATOR CIRCUIT WITH MULTIPLE LED PINS FOR ROBUST CONTROL OF LED CHAIN

TECHNICAL FIELD

This disclosure relates to current regulator circuits, such as current regulators used for driving and controlling light emitting diodes (LEDs) within a vehicle or a similar setting.

BACKGROUND

Driver circuits are often used to control a voltage, current, or power at a load. For instance, a light emitting diode (LED) driver circuit may control the power supplied to one or more light emitting diodes. Some LED driver circuits comprise current regulators that are configured to regulate the amount of current supplied to a string of LEDs that comprise a plurality of LEDs arranged in series.

SUMMARY

This disclosure is directed to circuits and techniques for controlling light emitting diodes (LEDs). The described circuits are configured to be connected to a string of LEDs via two or more separate pins, and the described circuits may define two or more separate current paths over the two separate pins and through the current regulator circuit. The current regulator circuit may regulate a total output current, but the current paths through the current regulator may automatically adapt to different conditions, including low battery conditions where a supply voltage may be insufficient to drive the entire chain of LEDs.

In some examples, this disclosure describes a circuit is configured to deliver current to a plurality of LEDs arranged in series. The circuit comprises a first LED pin on a first supply side of the circuit, wherein the first LED pin is configured to be connected to the plurality of LEDs arranged in series; and a second LED pin on the first supply side of the circuit, wherein the second LED pin is configured to be connected to a subset of the plurality of LEDs, wherein the subset comprises a portion of the plurality of LEDs. The circuit also comprises a third pin on a second supply side of the circuit, and the circuit is configured to: deliver a first current to the plurality of LEDs through the first LED pin and over a first current path through the circuit; and deliver a second current to the subset of the plurality of LEDs through the second LED pin and over a second current path through the circuit, wherein the second current path is in parallel with the first current path in the circuit, and wherein a sum of the first current and the second current is regulated based on a sensed current through the circuit.

In some examples, this disclosure describes a system comprising: a plurality of LEDs arranged in series; a sense resistor; and a circuit configured to deliver current to the plurality of LEDs. The circuit comprises a first LED pin on a first supply side of the circuit, wherein the first LED pin is connected to the plurality of LEDs; a second LED pin on the first supply side of the circuit, wherein the second LED pin is connected to a subset of the plurality of LEDs, wherein the subset comprises a portion of the plurality of LEDs and wherein the portion is arranged in series; and a third pin on a second supply side of the circuit, wherein the third pin is connected to the sense resistor. The circuit is configured to: deliver a first current to the plurality of LEDs through the first LED pin and over a first current path through the circuit; and deliver a second current to the subset of the plurality of LEDs through the second LED pin and over a second current path through the circuit, wherein the second current path is in parallel with the first current path in the circuit, wherein a sum of the first current and the second current is regulated based on a sensed current through the circuit, and wherein the sense resistor is configured to measure the sensed current.

In some examples, this disclosure describes a method of operating a circuit for delivering current to a plurality of LEDs arranged in series, the method comprising: delivering a first current to the plurality of LEDs through the first LED pin and over a first current path through the circuit; delivering a second current to the subset of the plurality of LEDs through the second LED pin and over a second current path through the circuit; and regulating a sum of the first current and the second current, wherein the second current path is in parallel with the first current path in the circuit, and wherein the sum of the first current and the second current is regulated based on a sensed current through the circuit.

Details of these and other examples are set forth in the accompanying drawings and the description below. Other features, objects, and advantages will be apparent from the description and drawings, and from the claims.

DETAILED DESCRIPTION

This disclosure is directed to circuits and techniques for regulating current to light emitting diodes (LEDs), such as in a vehicle or another setting. The circuits and techniques may be used to tail light LEDs of a vehicle, but in other examples, the circuits and techniques may be used for turn-signal lighting, exterior lights, interior lights, directional lights, vehicle headlamps, or any type of vehicle lighting that uses LEDs. Moreover, although described for vehicle settings, the described circuits and techniques for controlling LEDs can also be used in any other setting where LEDs are used.

In general, regulator circuits may control the amount of power provided to loads from power sources. In automotive applications, as one example, the power supply may vary within an operating voltage range of approximately 8 volts to 18 volts. However, in some cases, the voltage of the power supply can drop below specification and low voltage situations can cause challenges in LED operation. Also, LEDs can have a wide range of operating parameters and different LEDs may have different resistances and different power consumption. Binning can be used to associate LEDs with similar resistances, but LED regulator circuits may need to operate effectively with different sets of LEDS, which may consume more power or less power, depending on their binning. Also, LEDs can degrade or age over time, causing changes in resistance or power consumption. It is desirable to configure a regulator circuit to operate LEDs effectively, regardless of the binning, aging, changing battery voltage level, temperature variations that may affect circuit or LED performance, or other factors.

The circuits of this disclosure are configured to be connected to a string of LEDs via two or more separate pins, and the described circuits may define two or more separate current paths over the two separate pins and through the current regulator circuit. The current regulator circuit may regulate a total output current, but the current paths through the current regulator may automatically adapt to different conditions, including low battery conditions where a supply voltage may be insufficient to drive the entire chain of LEDs.

According to this disclosure, a "self-adaptive" current regulator concept has been designed, as described herein, to drive LEDs within a string of LEDs arranged in series. A first pin of the current regulator circuit may be connected to the entire string of LEDs connected in series, whereas a second pin may be connected to a subset of the entire string (also connected in series). Thus, the second pin may bypass one or more of the LEDs in the entire string and may only deliver current to the remaining subset of LEDs in a subset of the string of LEDs. The circuit may be configured to self-adapt to different situations and deliver output current over a first current path and a second current path, e.g., using the two different LED pins. If the supply voltage drops below a level needed to drive the entire string of LEDs via the first current path, for example, the LED regulator circuit may automatically adapt to bypass or partially bypass one or more LEDs and deliver more of the output current over the second current path. Moreover, the circuit may operate effectively without needing to monitor an external battery voltage that supplies power to the circuit.

Figure 1:
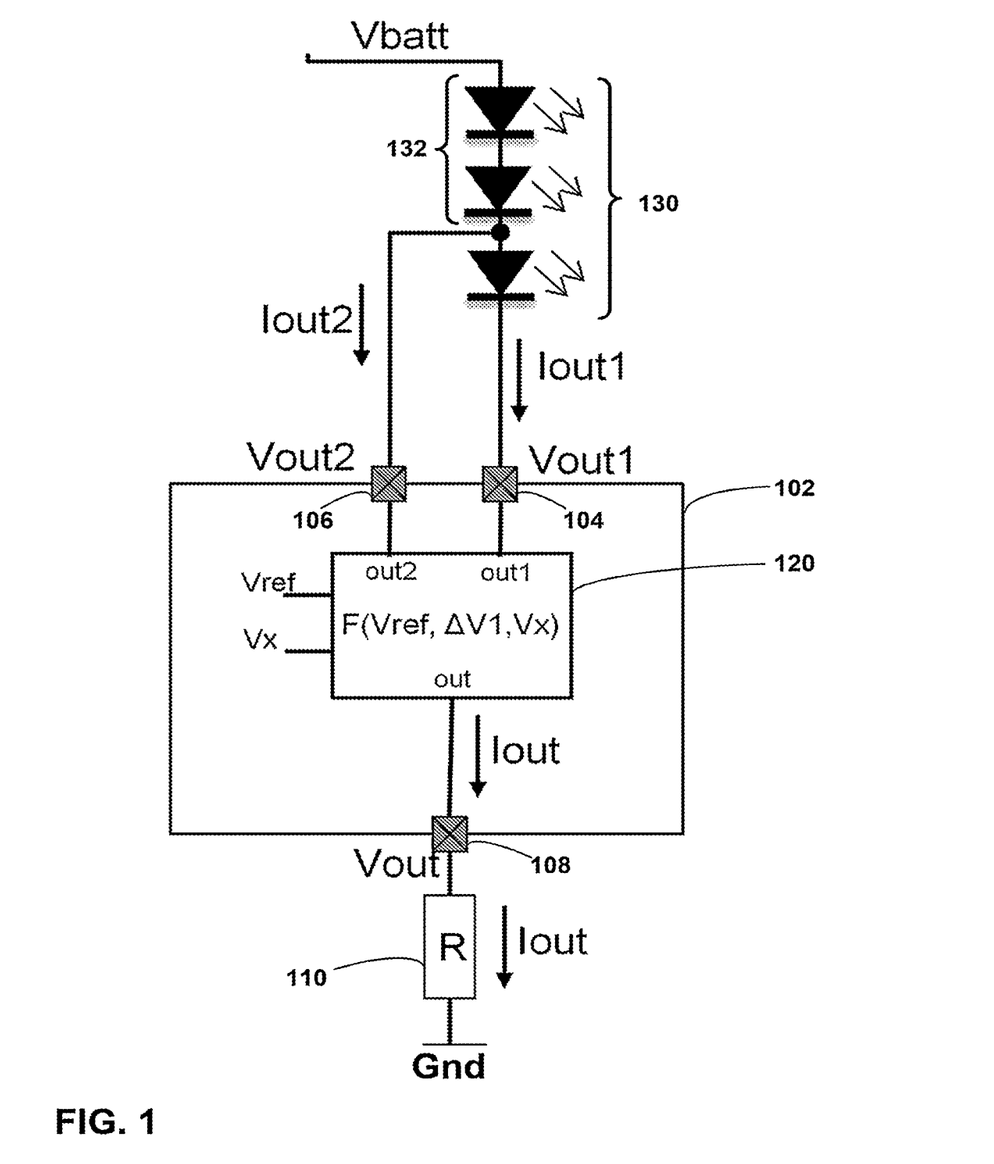
FIG. 1 is a block and circuit diagram of an example system that includes a current regulator circuit of this disclosure.

FIG. 1 is a block and circuit diagram of an example system that includes a current regulator circuit 102 of this disclosure. The system of FIG. 1 includes a plurality of LEDs 130 arranged in series on a first supply side of circuit 102 (e.g., the battery side) and a sense resistor 110 on a second supply side of circuit 102 (e.g., the ground side). LEDs 130 may be arranged between the battery and circuit 102, and sense resistor 110 may be arranged between ground and circuit 102. In other examples, however, the supply sides may be reversed, with the battery connected to the sense resistor and the ground connected to the LEDs.

Circuit 102 may be configured to deliver current to the plurality of LEDs 130. Circuit 102 comprises a first LED pin 104 on a first supply side (e.g., the battery side) of circuit 102, wherein first LED pin 104 is configured to be connected to the plurality of LEDs 130 arranged in series. Circuit 102 also includes a second LED pin 106 on the first supply side of circuit 102, wherein second LED pin 106 is configured to be connected to a subset 132 of the plurality of LEDs, wherein the subset comprises a portion of the plurality of LEDs. Second LED pin 106 essentially bypasses one or more of the LEDs in the plurality of LEDs 130 and is connected to subset 132, which excludes one or more of the LEDS in the plurality of LEDs 130. In other words, subset 132 comprises a portion of the plurality of LEDs 130. Both the plurality of LEDs 130 and the subset 132 each comprise a set of LEDs arranged in series. Subset 132 includes fewer LEDs in series than the entire plurality of LEDs 130.

A third pin 108 is located on a second supply side (e.g., the ground side) of circuit 102, and third pin 108 may be configured to be connected to an external sense resistor 110. Alternatively, in still other examples, sense resistor 110 could be an internal resistor (i.e., internal to circuit 102), with third pin 108 being connected directly to ground. In any case, circuit 102 includes circuitry 120 that is configured to deliver a first current (Iout1) to the plurality of LEDs 130 through the first LED pin 104 and over a first current path through circuit 102, and circuitry 120 is further configured to deliver a second current (Iout 2) to the subset 132 of the plurality of LEDs through the second LED pin 106 and over a second current path through the circuit 102. The second current path is in parallel with the first current path in circuit 102, and wherein a sum (Iout) of the first current (Iout 1) and the second current (Iout 2) is regulated based on a sensed current through the circuit. The sensed current, for example may comprise a measurement of Iout over sense resistor 110. The sensed current may be determined based on a measured voltage drop over sense resistor 110, i.e., based on Ohms law and a known resistance of sense resistor 110.

Circuitry 120 of circuit 102 may be configured automatically define the first current (Iout 1) and the second current (Iout 2) based on a pre-defined function. For example, the pre-defined function may be based on whether first LED pin 104 receives enough voltage for a voltage headroom associated with the first current path to drive the entire plurality of LEDs 130.

Figure 2:
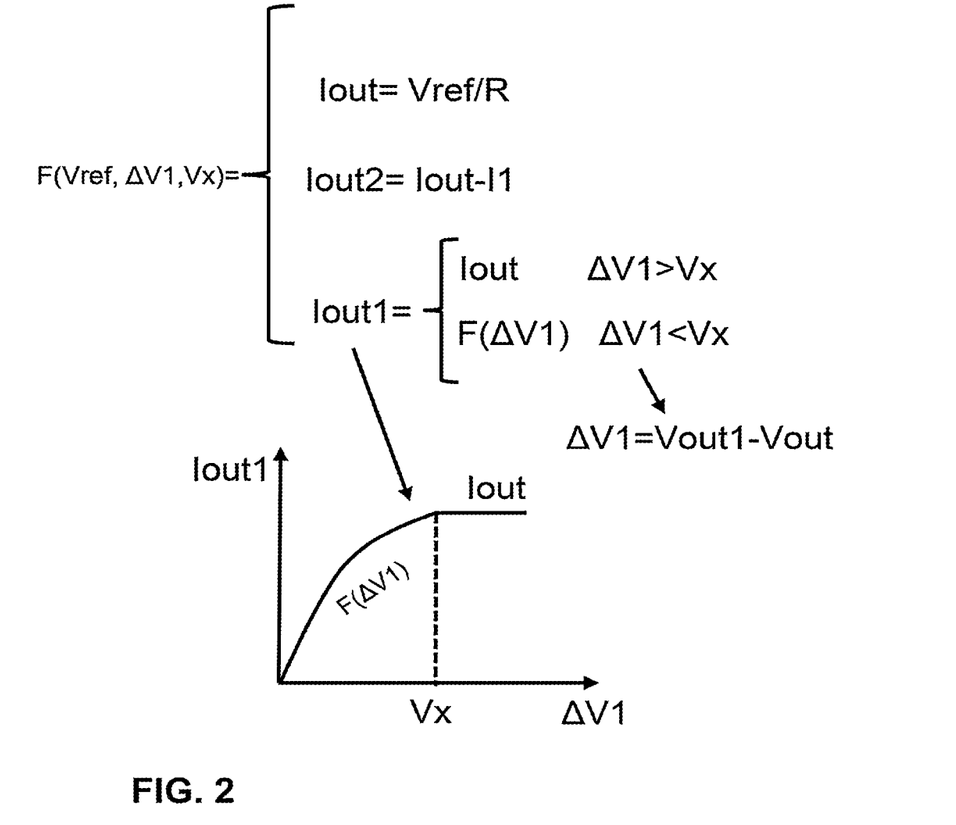
FIG. 2 is a graph and associated equations showing output currents as a function of voltages that can be identified by a regulator circuit of this disclosure.

FIG. 2 is a graph and associated equations showing output currents as a function of voltages that can be identified by a regulator circuit 102 of this disclosure. Output current (Iout) may be regulated based on a Vref, and output current (Iout) may be defined as Vref/R, where R represents the resistance of sense resistor 110. Output current of regulator circuit 102 is also referred to herein as the sensed current over a sense resistor, insofar as the output current (Iout) is defined as Vref/R, where R represents the resistance of sense resistor 110. The second current (Iout 2) is defined as the total current (Iout) minus the first current (Iout 1) through the first current path.

In order to define the output current (Iout), an accurate internal (or external) Vref voltage reference can be maintained stable by a control loop on third pin 108, which is connected to sense resistor 110. A single control loop can be regulated based on a reference voltage Vref in order to dynamically adjust the output currents on both an Iout 1 current path and an Iout 2 current path in order to regulate the total amount desired output current. $\Delta V1$ refers to the voltage head-room the first current path associated with first LED pin 104, where all the plurality of LEDs 130 are connected. $\Delta V2$ refers to the voltage head-room of the second current path associated with second LED pin 106, where just a subset 132 of the LEDs are connected. Vx refers to an internal (or external) threshold used by the regulation loop to automatically move the priority from one current path to the other depending on the boundary conditions.

As shown in FIG. 2, when $\Delta V1$ is above Vx, circuit 102 operates with Iout 1 being equal to Iout. In this case, substantially all of the output current passes through the entire string of LEDs 130, over first LED pin 104, and over the first current path of circuit 102. When $\Delta V1$ is above Vx, approximately zero current passes over second LED pin 106 and through the second current path of circuit 102. Some current leakage may occur, hence, this disclosure refers to "approximately" zero current as meaning zero current, possibly with some minor leakage current.

As further shown in FIG. 2, when ΔV1 falls below Vx, circuit 102 operates with Iout 1 being reduced as a function of ΔV1. In this case, some of Iout current may flow over first LED pin 104, and over the first current path of circuit 102, and some of Iout current passes over second LED pin 106 and through the second current path of circuit 102. Moreover, if ΔV1 falls below Vx by a significant amount, then the second current Iout 2 through second LED pin 106 and over the second current path of circuit 102 may comprise the output current Iout, with "approximately" zero current flowing over first LED pin 104 and through the first current path. Additional details of the operation of the two separate current paths as a function of supply voltage is shown in FIG. 3.

Figure 3:
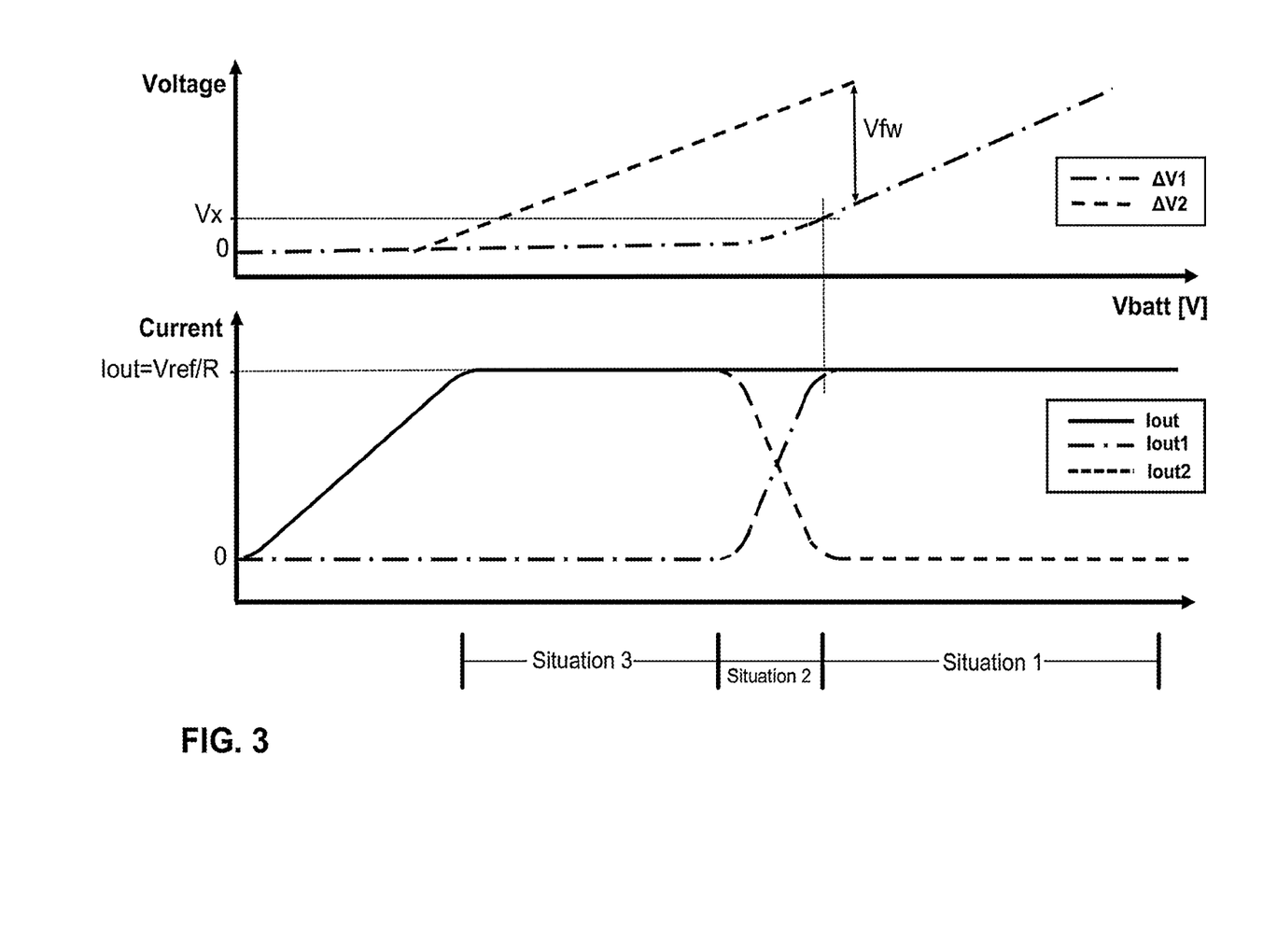
FIG. 3 are two related graphs showing voltage values and output currents that depend on the voltage values consistent with a current regulator circuit of this disclosure.

FIG. 3 are two related graphs showing voltage values and output currents that depend on the voltage values consistent with a current regulator circuit of this disclosure. The X axis of the graphs in FIG. 3 correspond to an increasing battery voltage (Vbatt), i.e., increasing from left to right.

The top graph in FIG. 3 illustrates ΔV1 and ΔV2 as a function of increasing battery voltage (left to right). Vx is also illustrated in the top graph of FIG. 3. Vfwd refers to a single unit LED forward voltage which, in the example of a single LED being bypassed by second LED pin 106 relative to first LED pin 104, can also be expressed as Vfwd=ΔV2−ΔV1.

The bottom graph in FIG. 3 illustrates total output current (Iout), the first current (Iout 1) through a first current path of circuit 102, and the second current (Iout 2) through a second current path of circuit 102, as a function of increasing battery supply voltage (left to right). Moreover, FIG. 3 showcases three different situations associated with circuit 102. The total output current (Iout) is also referred to herein as a sensed current over a sense resistor, insofar as the output current (Iout) can be defined based on a voltage drop over sense resistor 110, i.e., using Ohms law and a known resistance of sense resistor 110.

As shown in FIG. 3, in a first situation (i.e., "Situation 1"), the first current (Iout 1) is equal to the output current (Iout) and the second current (Iout 2) is approximately zero. The first situation may correspond to situations of ample supply voltage for driving the entire string of LEDs 130. However, as further shown in FIG. 3, in a second situation (i.e., "Situation 2"), the first current (Iout 1) and the second current (Iout 2) are both non-zero and collectively sum to the output current (Iout). For example, the second situation may correspond to a lower battery voltage than the first situation, but circuit 102 operates its current delivery automatically without any explicit (external) monitoring the battery voltage.

As also shown in FIG. 3, in a third situation (i.e., "Situation 3"), the second current (Iout 2) is equal to the output current (Iout) and the first current (Iout 1) is approximately zero. The third second situation may correspond to an even lower battery voltage than the second situation. Moreover, Iout 2 being substantially equal to Iout may be based on the first LED pin 104 receiving insufficient voltage for the voltage headroom of the first current path to drive the entire plurality of LEDs 130. In this case, one or more LEDs of the plurality of LEDs 130 are completely bypassed, and all of the output current Iout passes through the subset of LEDs 132, over second LED pin 106 and through the second current path of circuit 102. In this third situation, "approximately" zero current passes over first LED pin 104 and through the first current path of circuit 102.

Accordingly, circuit 102 of FIG. 1 may automatically adapt its current through two or more different current paths depending on external conditions, such as changing battery voltage level, or other factors. Moreover, circuit 102 may automatically adapt to other conditions, such as binning (i.e., different LEDs with different operational parameters, which may be organized by binning), aging of the circuit of the LEDS, temperature variations that may affect circuit or LED performance, or other factors.

Figure 4:
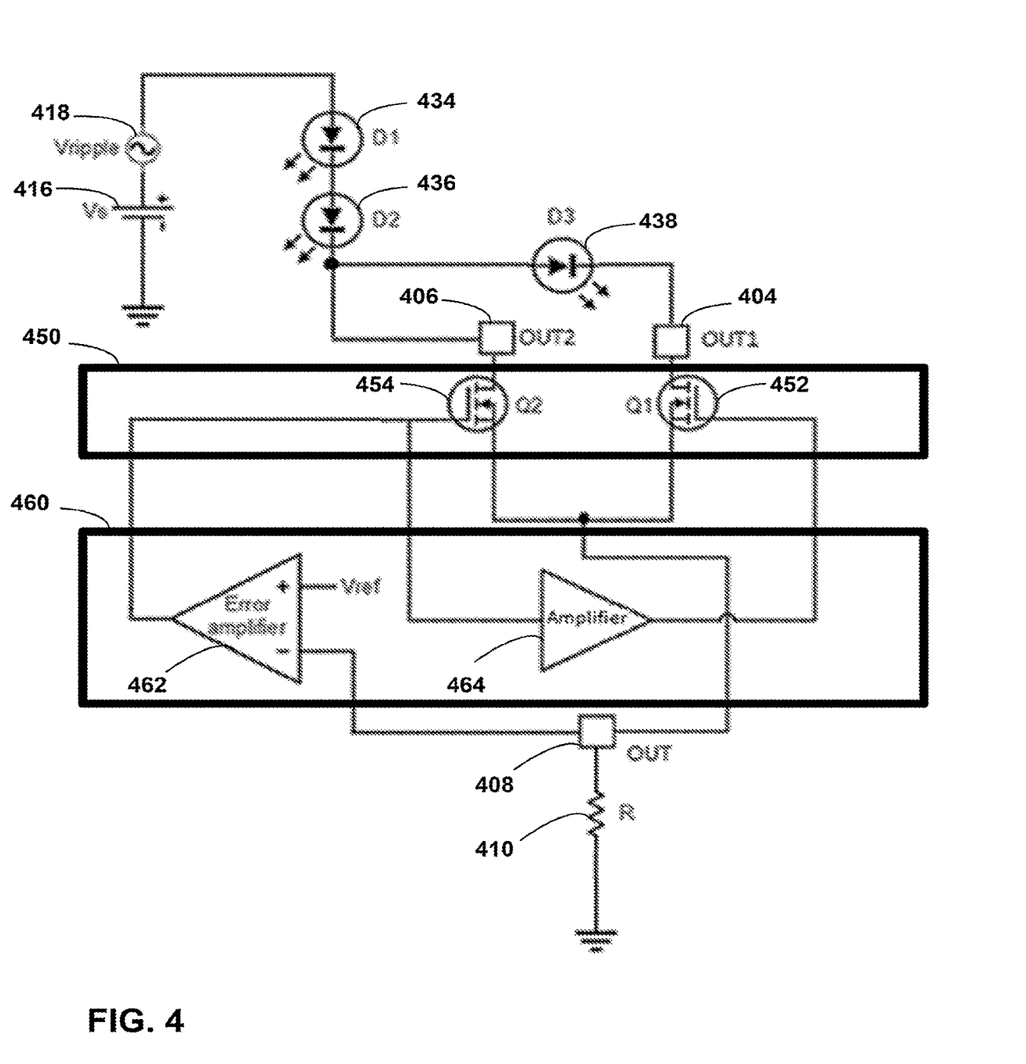
FIG. 4 is a circuit diagram of another example system that includes a current regulator circuit of this disclosure.

FIG. 4 is a circuit diagram of another example system that includes a current regulator circuit of this disclosure. The regulator circuit of FIG. 4 may comprise first and second LED pins 404, 406 positioned on a first supply side of the circuit, and a third pin 408 positioned on a first supply side of the circuit. The circuit may comprise transistor circuits 450 and control circuitry 460 configured to control transistor circuits 450 so as to achieve operation of two different current paths through the circuit, as described herein.

First and second LED pins 404, 406 may be configured to be connected to a string of LEDs in two separate locations. The string of LEDs, i.e., LEDs 434, 436, and 438 may be connected to a battery source 416, which often includes some voltage ripple 418. Third pin 408 is located on a second supply side (e.g., the ground side) of circuit 120, and third pin 108 may be configured to be connected to an external sense resistor 410. Alternatively, in still other examples, sense resistor 410 could be an internal resistor (i.e., on the internal side of third pin 408), with third pin 108 being connected directly to ground. Also, in yet other examples, sense resistor 410 could be positioned on the battery side of the circuit, and LEDs the string of LEDs, i.e., LEDs 434, 436, and 438, could be positioned on the ground side. Other modifications could also be made without departing from the sprit and scope of this disclosure.

The circuit shown in FIG. 4 is another example of a regulator circuit configured to deliver current to a plurality of LEDs arranged in series, i.e., LEDs 434, 436, and 438. The regulator circuit may comprise first LED pin 404 on a first supply side of the circuit, wherein the first LED pin is configured to be connected to the plurality of LEDs arranged in series, i.e., LEDs 434, 436, and 438. The regulator circuit may also comprise a second LED pin 406 on the first supply side of the circuit, wherein the second LED pin is configured to be connected to a subset of the plurality of LEDs, i.e., LEDs 434 and 436, wherein the subset comprises a portion of the plurality of LEDs. Second LED pin 406 essentially bypasses LED 438 of the set of LEDs, and merely connects to a subset of the LEDs, i.e., LEDs 434 and 436.

Again, a third pin 408 is positioned on a second supply side of the circuit. The regulator circuit shown in FIG. 4 is configured to deliver a first current to the plurality of LEDs (i.e., LEDs 434, 436, and 438) through first LED pin 404 and over a first current path through the circuit (i.e., through Q1 transistor 452). In addition, the regulator circuit shown in FIG. 4 is further configured to deliver a second current to the subset of the plurality of LEDs (i.e., LEDs 434 and 436) through second LED pin 406 and over a second current path through the circuit (i.e., through Q2 transistor 454). The second current path (i.e., through Q2 transistor 454) is in parallel with the first current path (i.e., through Q1 transistor 452) in the circuit, and a sum of the first current and the second current is regulated based on a sensed current through the circuit. The sensed current can be measured over sense resistor 410. The sensed current through resistor 410 may also be referred to as the total output current of the regulator circuit shown in FIG. 4.

A first transistor (Q1 transistor 452) is in the first current path and is configured to control delivery of the first current via the first current path to the plurality of LEDs (i.e., LEDs 434, 436, and 438) via the first LED pin 404. A second transistor (Q2 transistor 454) is in the second current path and is configured to control delivery of the second current via the second current path to the subset of the plurality of LEDs (i.e., LEDs 434 and 436) via the second LED pin 406.

Control circuitry 460 may be configured to control transistor circuits 450 so as to achieve operation of two different current paths through the circuit, as described herein. In some examples, control circuitry 460 may comprise an error amplifier 462 (e.g., an operational amplifier) configured to generate a main control signal (i.e., the output of error amplifier 462) for regulating the first current path and the second current path based on the sensed current. In general, control circuitry 460 may be configured to provide priority to the first current path through Q1 transistor 452 as long as there is sufficient voltage to drive the entire chain of LEDs (i.e., LEDs 434, 436, and 438). Control circuitry 460 may be further configured to move current from the first current path through Q1 transistor 452 to the second current path through Q2 transistor 454 when there is insufficient voltage to properly drive the entire chain of LEDs without any flickering. In this case, the subset of LEDs (i.e., LEDs 434 and 436) may still be driven properly by moving some or all of the output current from the first current path over first LED pin 404 to the second current path over second LED pin 406.

In some examples, the main control signal (i.e., the output of error amplifier 462) defines a first control signal for controlling the gate of the Q2 transistor 454, wherein the circuit is further configured to generate a second control signal for Q1 transistor 452 as a function of the main control signal. Error amplifier 462, for example, may comprise an operational amplifier circuit. A second amplifier circuit 464 may be configured to generate a second control signal for controlling the gate of Q1 transistor 452 as a function of the main control signal. Thus, the main control signal may comprise the output of error amplifier 462 and the second control signal (which is a function of the main control signal) may comprise the output of second amplifier circuit 464.

Figure 5:
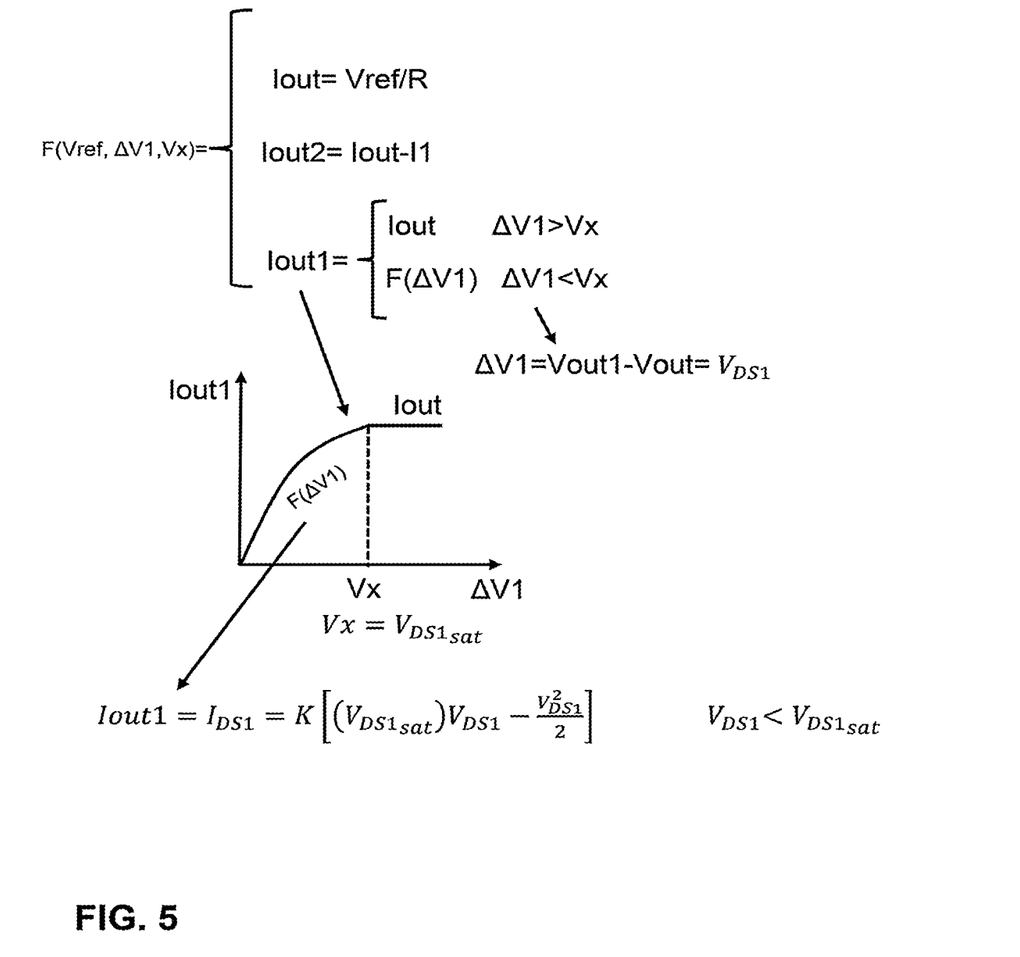
FIG. 5 is another graph and associated equations showing output currents as a function of voltages that can be identified by a regulator circuit of this disclosure.

FIG. 5 is another graph and associated equations showing output currents as a function of voltages that can be identified by a regulator circuit of this disclosure, such as that shown and described in FIG. 4.

As shown in FIG. 5, output current (Iout) may be regulated based on a Vref, and output current (Iout) may be defined as Vref/R, where R represents the resistance of sense resistor 110. The second current (Iout 2) is defined as the total current (Iout) minus the first current (Iout 1) through the first current path.

In order to define the output current (Iout), an accurate internal (or external) Vref voltage reference can be maintained stable by a control loop on third pin 408, which is connected to sense resistor 410 in the example shown in FIG. 4. A single control loop can be regulated based on a reference voltage Vref in order to dynamically adjust the output currents on both an Iout 1 current path and an Iout 2 current path in order to regulate the total amount desired output current. ΔV1 refers to the voltage head-room the first current path associated with first LED pin 404, where all the plurality of LEDs (i.e., LEDs 434, 436, 438) are connected. ΔV2 refers to the voltage head-room of the second current path associated with second LED pin 406, where just a subset of the LEDs (i.e., LEDs 434 and 436) are connected. Vx refers to an internal (or external) threshold used by the regulation loop to automatically move the priority from one current path to the other depending on the boundary conditions.

As shown in FIG. 5, when ΔV1 is above Vx, the circuit operates with Iout 1 being equal to Iout. In this case, substantially all of the output current passes through the entire string of LEDs (i.e., LEDs 434, 436, 438), over first LED pin 404, and over the first current path of the circuit through Q1 transistor 452. When ΔV1 is above Vx, approximately zero current passes over second LED pin 406 and through the second current path of the circuit through Q2 transistor 454. Again, as noted above, some current leakage may occur, hence, this disclosure refers to "approximately" zero current as meaning zero current, possibly with some minor leakage current.

As further shown in FIG. 5, when ΔV1 falls below Vx, the circuit operates with Iout 1 being reduced as a function of ΔV1. In this case, some of Iout current may flow over pin 504, and over the first current path of the circuit through Q1 transistor 452, and some of Iout current passes over second LED pin 406 and through the second current path of the circuit through Q2 transistor 454. Moreover, if ΔV1 falls below Vx by a significant amount, then the second current Iout 2 through second LED pin 406 and over the second current path may comprise the output current Iout, with "approximately" zero current flowing over first LED pin 404 and through the first current path. In the equations shown in FIG. 5, $V_{DS1}$ refers to the voltage drop across Q1 transistor 452, $I_{DS1}$ refers to the current used to drive one LED, and $V_{DS1sat}$ refers to a saturation voltage level associated with Q1 transistor 452.

The examples above describe regulator circuits with two separate current paths, but it is also possible to create additional current paths, i.e., any number N current paths, where N is any positive integer greater than 2. For example, a circuit consistent with circuit 102 or the regulator circuit shown in FIG. 4 could further include a third LED pin configured to be connected to a subset of the subset of the plurality of LEDs, wherein the subset of the subset comprises a sub-portion of the portion of the plurality of LEDs, wherein the sub-portion of the portion of the plurality of LEDs are arranged in series. In this case, the sum (which corresponds to the regulated output current) corresponds to the first current and the second current and the third current. Consistent with this explanation, a circuit could include even more than 3 LED pins. For example, a circuit could include N LED pins configured to be connected to different sets of the plurality of LEDs, wherein N is a positive integer greater than 3, wherein LEDs in each of the different sets are arranged in series. In this case, the sum (which corresponds to the regulated output current) corresponds to all currents associated with each of the N LED pins.

Figure 6:
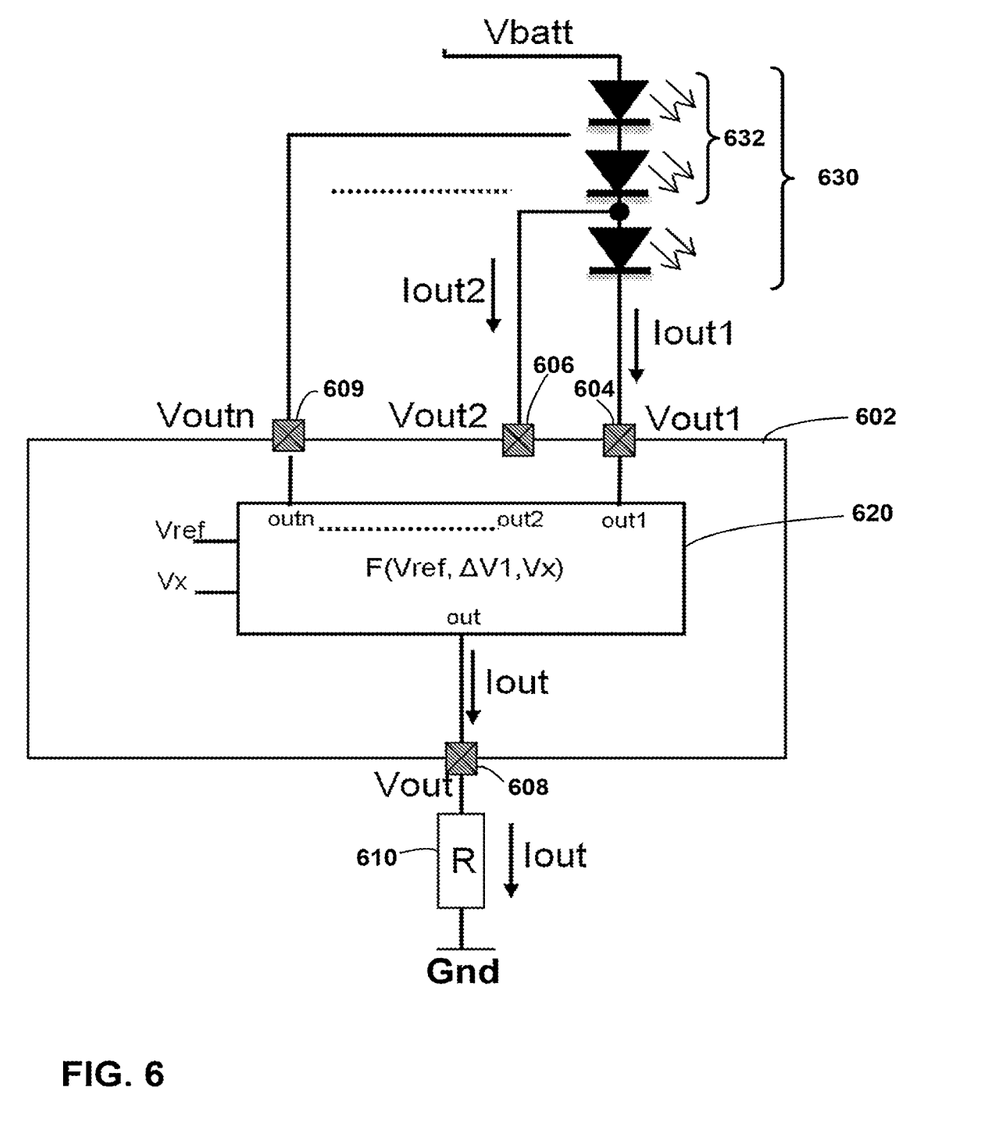
FIG. 6 is another block and circuit diagram of an example system that includes a current regulator circuit of this disclosure.

FIG. 6 is another diagram similar to FIG. 1, but FIG. 6 shows that the circuit may include any number of LED pins configured to be connected to different sets of the plurality of LEDs. The set of LEDs 630 may include any number of LEDs (merely three LEDs are shown for simplicity). The set of LEDs 630 may be connected to first LED pin 604. A subset of LEDs 632 may be connected to second LED pin 606, and another smaller subset may be connected to third LED pin 609. Again, any number of LED pins may be used to manage an LED chain having any number of LEDs. An output pin 608 is configured to be connected to an external sense resistor 610, but again, the sense resistor 610 could be located inside of the circuit in other examples. Also, in other examples, LEDs 630 could be positioned on the ground side and sense resistor 610 could be positioned on the battery side. In other words, the "first supply side" and the "second supply side," as used herein, may refer to a battery side and a ground side, or vice versa. Also, another reference voltage (i.e., not necessarily ground) could be used, particularly if the circuit is galvanically isolated from actual ground.

Circuitry 620 of circuit 602 may be configured automatically define the first current (Iout 1), the second current (Iout 2), and any number of additional currents Iout N) over any number of additional current paths, based on a pre-defined function. Like other examples, the pre-defined function may be based on whether first LED pin 604, second LED pin 606, or any number of additional LED pins, respectively receives enough voltage for a voltage headroom associated with the respective current path to drive the respective set or a respective subset of a plurality of LEDs 630. Like other examples describe herein, circuit 602 may be regulated based on the total output current though circuit 602, which corresponds to the sensed current over sense resistor 610. Circuit 602 automatically apportions current to the different current paths as a function of Vref, Vx, and ΔV associated with each of the current paths.

The circuits described herein can achieve robustness to battery supply voltage variation in combination with different numbers of LEDs in series in the LED chain. Moreover, the circuits can achieve a desirable bypass circuit that operates in full bypass mode (situation 3 of FIG. 3), partial bypass mode (situation 2 of FIG. 3), or without bypass (situation 1 of FIG. 3). Indeed, the circuits can achieve these different bypass modes solely based on a regulation loop, and not based on any monitoring of the battery voltage.

In some examples, battery voltage has a typical value of 12.5 volts, but battery voltage can vary from 6 volts to 18 volts in a normal functional range. For this reason, when designing a rear light led driver application for a vehicle, one usually avoids more than 2 red LED with forward voltage of 2.4 volts in order to ensure that the LED chain is always on without flickering. This constrain implies that, in order to add more channels to be able to reach the required minimum light for a particular application, the system may need to add cost to the driver solution. However, with the circuit of this disclosure, it is possible to add or use more series LEDs, while avoiding flickering when the Vbatt is at its minimum value or below.

Moreover, the described circuits may improve operation that might otherwise be affected by external factors, such as binning, LED variations, temperature-dependent variations in circuit or LED performance or operation, aging-dependent variations in circuit or LED performance or operation, battery variation and voltage ripples, or other factors. Some of these factors may also compound when multiple LEDs are driven in series insofar as each LED can create additional variations due to binning, LED variations, temperature-dependent variations, aging-dependent variations, or other factors.

In some examples, the techniques of this disclosure can enable the ability to bypass one or more LEDs connected between two LED pins (e.g., bypass LED 438 shown in FIG. 4) moving the current from a first LED pin 404 to a second LED pin 406, with a defined function, when the Vbatt voltage is unable to supply all the LED's present on the entire LED Chain. Moreover, this bypass may occur automatically and without any need of monitor the Vbatt signal. The circuit operation may also define a partial-bypass phase where some (but not all) of the current is moved from the first LED pin 104, 404, 604 to a second LED pin 106, 406, 606. This partial-bypass phase, for example, may correspond to situation 2 shown in FIG. 3.

The circuits and techniques of this disclosure may be robust against any $V_{LED}$ (LED voltage) forward variations, and the circuit does not need any additional monitor signal. During the LED bypass, the current on the remaining LED's in the chain will remain constant while the current on the bypassed LED will decrease following a defined function, such as illustrated in FIG. 3 (specifically situation 2).

Figure 7:
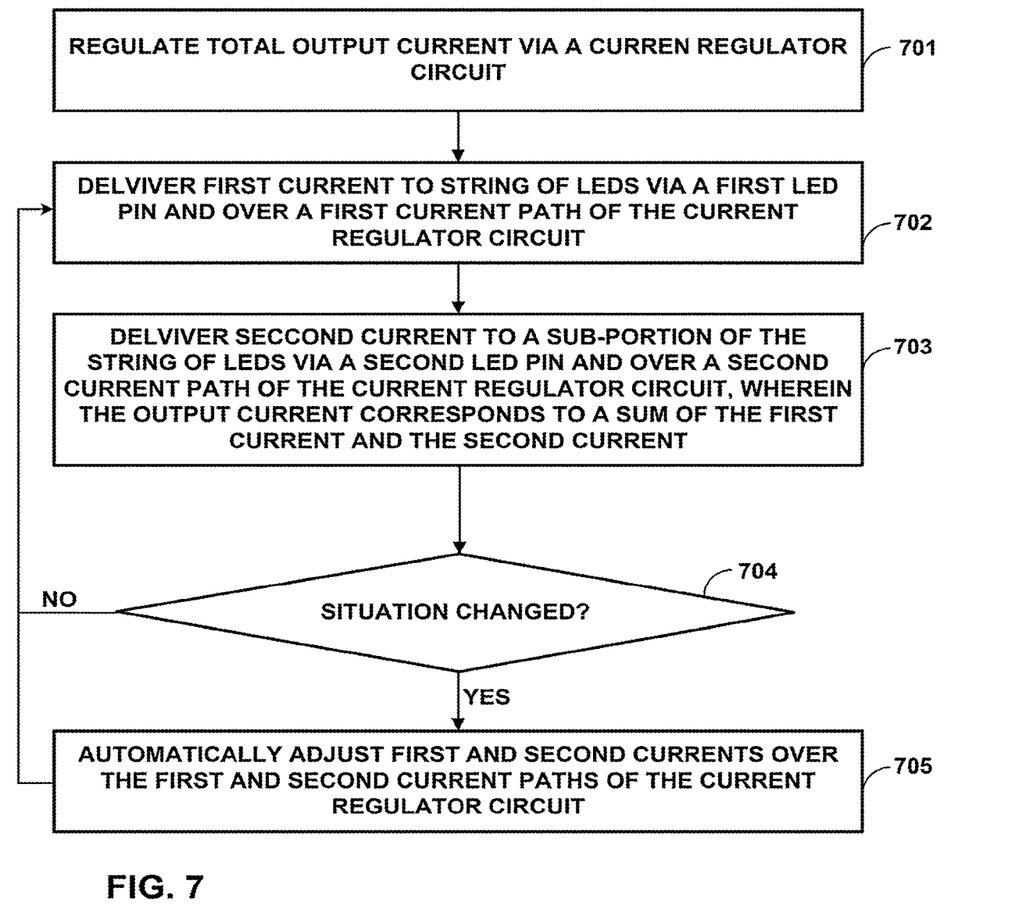
FIG. 7 is a flow diagram showing a method that may be performed by a current regulator circuit consistent with this disclosure.

FIG. 7 is a flow diagram showing a method that may be performed by a regulator circuit, such as circuit 102, circuit 602, the regulator circuit shown in FIG. 4, or another similarly designed circuit. As shown in FIG. 7, the regulator circuit regulates a total output current through the circuit (701). The regulated current may comprise a sum of two or more currents that may be delivered over two or more current paths through the regulator circuit.

The circuit may deliver a first current to the plurality of LEDs through a first LED pin and over a first current path through the circuit (702), and may deliver a second current to a subset of the plurality of LEDs through a second LED pin and over a second current path through the circuit (703). Then, if the situation changes (yes of 704), such as battery supply voltage changing, or possibly long-term circuit changes due to temperature, aging, or other factors, the circuit may automatically adjust the first and second currents over the first and second current paths (705), as described herein.

Following any such adjustment (705), the circuit may then deliver a different first current to the plurality of LEDs through the first LED pin and over the first current path through the circuit (702), and may deliver a different second current to the subset of the plurality of LEDs through the second LED pin and over a second current path through the circuit (703). The total output current of the current regulator may always be equal to the sum of currents delivered over the different current paths through the circuit.

In some examples, the techniques described in this disclosure may be implemented, at least in part, in circuitry, hardware, software, firmware or any combination thereof. For example, various aspects of the described techniques may be implemented within one or more logical elements, processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

It may also be possible for one or more aspects of this disclosure to be performed in software, in which case those aspects of the techniques described in this disclosure may also be embodied or encoded in a computer-readable medium, such as a computer-readable storage medium, containing instructions. Instructions embedded or encoded in a computer-readable storage medium may cause a programmable processor, or other processor, to perform a method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, or other computer readable media.

The following clauses may illustrate one or more aspects of the disclosure.

Clause 1—A circuit configured to deliver current to a plurality of LEDs arranged in series, the circuit comprising: a first LED pin on a first supply side of the circuit, wherein the first LED pin is configured to be connected to the plurality of LEDs arranged in series; a second LED pin on the first supply side of the circuit, wherein the second LED pin is configured to be connected to a subset of the plurality of LEDs, wherein the subset comprises a portion of the plurality of LEDs; and a third pin on a second supply side of the circuit, wherein the circuit is configured to: deliver a first current to the plurality of LEDs through the first LED pin and over a first current path through the circuit; and deliver a second current to the subset of the plurality of LEDs through the second LED pin and over a second current path through the circuit, wherein the second current path is in parallel with the first current path in the circuit, and wherein a sum of the first current and the second current is regulated based on a sensed current through the circuit.

Clause 2—The circuit of clause 1, wherein the third pin is configured to be connected to a sense resistor, wherein the sensed current is determined based on a voltage drop over the sense resistor.

Clause 3—The circuit of clause 1 or 2, further comprising: a first transistor in the first current path and configured to control delivery of the first current via the first current path to the plurality of LEDs via the first LED pin; and a second transistor in the second current path and configured to control delivery of the second current via the second current path to the subset of the plurality of LEDs via the second LED pin.

Clause 4—The circuit of any of clauses 1-3, further comprising: an operational amplifier configured to generate a main control signal for regulating the first current path and the second current path based on the sensed current.

Clause 5—The circuit of clause 4, wherein the first current path includes a first transistor, wherein the second current path includes a second transistor, wherein the main control signal defines a first control signal for the second transistor, and wherein the circuit is configured to generate a second control signal for the first transistor as a function of the main control signal.

Clause 6—The circuit of any of clauses 1-5, wherein the circuit is configured automatically define the first current and the second current based on a pre-defined function.

Clause 7—The circuit of clause 6, wherein the pre-defined function is based on whether the first LED pin receives enough voltage for a voltage headroom associated with the first current path to drive the plurality of LEDs.

Clause 8—The circuit of clause 7, wherein: in a first situation, the first current is equal to the sensed current and the second current is approximately zero; and in a second situation, the first current and the second current are both non-zero and collectively sum to the sensed current.

Clause 9—The circuit of clause 8, wherein the second situation corresponds to a lower battery voltage than the first situation, wherein the plurality of LEDs is arranged between a battery and the first and second LED pins.

Clause 10—The circuit of any of clauses 7-9, wherein: in a third situation, based on the first LED pin having insufficient voltage for the voltage headroom of the first current path to drive the plurality of LEDs, the second current is equal to the sensed current and the first current is approximately zero.

Clause 11—The circuit of any of clauses 1-10, wherein the portion of the plurality of LEDs are arranged in series.

Clause 12—The circuit of any of clauses 1-11, further comprising: a third LED pin configured to be connected to a subset of the subset of the plurality of LEDs, wherein the subset of the subset comprises a sub-portion of the portion of the plurality of LEDs, wherein the sub-portion of the portion of the plurality of LEDs are arranged in series, and wherein the sum corresponds to the first current and the second current and a third current through the third LED pin.

Clause 13—The circuit of clause 12, further comprising: N LED pins configured to be connected to different sets of the plurality of LEDs, wherein N is a positive integer greater than 3, wherein LEDs in each of the different sets are arranged in series, and wherein the sum corresponds to all currents associated with each of the N LED pins.

Clause 14—The circuit of any of clauses 1-13, wherein the first supply side corresponds to a battery side and the plurality of LEDs are arranged between a battery and the first and second LED pins, and wherein the second supply side corresponds to a ground side and a sense resistor is arranged between a ground and the third pin.

Clause 15—A system comprising: a plurality of LEDs arranged in series; a sense resistor; and a circuit configured to deliver current to the plurality of LEDs, the circuit comprising: a first LED pin on a first supply side of the circuit, wherein the first LED pin is connected to the plurality of LEDs; a second LED pin on the first supply side of the circuit, wherein the second LED pin is connected to a subset of the plurality of LEDs, wherein the subset comprises a portion of the plurality of LEDs and wherein the portion is arranged in series; and a third pin on a second supply side of the circuit, wherein the third pin is connected to the sense resistor, wherein the circuit is configured to: deliver a first current to the plurality of LEDs through the first LED pin and over a first current path through the circuit; and deliver a second current to the subset of the plurality of LEDs through the second LED pin and over a second current path through the circuit, wherein the second current path is in parallel with the first current path in the circuit, wherein a sum of the first current and the second current is regulated based on a sensed current through the circuit, and wherein the sense resistor is configured to measure the sensed current.

Clause 16—The system of clause 16, the circuit further comprising: an operational amplifier configured to generate a main control signal for regulating the first current path and the second current path based on the sensed current, wherein the first current path includes a first transistor, wherein the second current path includes a second transistor, wherein the main control signal defines a first control signal for the second transistor, and wherein the circuit is configured to generate a second control signal for the first transistor as a function of the main control signal.

Clause 17—The system of clause 15 or 16, wherein the circuit is configured automatically define the first current and the second current based on a pre-defined function, wherein the pre-defined function is based on whether the first LED pin receives enough voltage for a voltage headroom associated with the first current path to drive the plurality of LEDs, and wherein: in a first situation, the first current is equal to the sensed current and the second current is approximately zero; in a second situation, the first current and the second current are both non-zero and collectively sum to the sensed current; and in a third situation, based on the first LED pin having insufficient voltage for the voltage headroom of the first current path to drive the plurality of LEDs, the second current is equal to the sensed current and the first current is approximately zero.

Clause 18—A method of operating a circuit for delivering current to a plurality of LEDs arranged in series, the method comprising: delivering a first current to the plurality of LEDs through a first LED pin and over a first current path through the circuit; delivering a second current to a subset of the plurality of LEDs through a second LED pin and over a second current path through the circuit; and regulating a sum of the first current and the second current, wherein the second current path is in parallel with the first current path in the circuit, and wherein the sum of the first current and the second current is regulated based on a sensed current through the circuit.

Clause 19—The method of clause 18, further comprising: generating a main control signal for regulating the first current path and the second current path based on the sensed current, wherein the first current path includes a first transistor, wherein the second current path includes a second transistor, wherein the main control signal defines a first control signal for the second transistor; and generating a second control signal for the first transistor as a function of the main control signal.

Clause 20—The method of clause 18, wherein: in a first situation, the first current is equal to the sensed current and the second current is approximately zero; in a second situation, the first current and the second current are both non-zero and collectively sum to the sensed current; and in a third situation, based on the first LED pin having insufficient voltage for a voltage headroom of the first current path to drive the plurality of LEDs, the second current is equal to the sensed current and the first current is approximately zero.

Various aspects have been described in this disclosure. These and other aspects are within the scope of the following claims.

The invention claimed is:

1. A circuit configured to deliver current to a plurality of light emitting diodes (LEDs) arranged in series, the circuit comprising:
a first LED pin on a first supply side of the circuit, wherein the first LED pin is configured to be connected to the plurality of LEDs arranged in series;
a second LED pin on the first supply side of the circuit, wherein the second LED pin is configured to be connected to a subset of the plurality of LEDs, wherein the subset comprises a portion of the plurality of LEDs; and
a third pin on a second supply side of the circuit,
wherein the circuit is configured to:
deliver a first current to the plurality of LEDs through the first LED pin and over a first current path through the circuit, wherein the first current path includes a first transistor; and
deliver a second current to the subset of the plurality of LEDs through the second LED pin and over a second current path through the circuit, wherein the second current path includes a second transistor, wherein the second current path is in parallel with the first current path in the circuit, and wherein a sum of the first current and the second current is regulated based on a sensed current through the circuit, wherein regulation of the first current path and the second current path comprises a single regulation loop by the circuit, wherein to perform the single regulation loop, the circuit includes:
an operational amplifier configured to generate a main control signal for regulating both the first current path and the second current path based on the sensed current and a voltage reference signal, wherein the main control signal defines a first control signal for the second transistor; and
a second amplifier that includes a single input connected to an output of the operational amplifier, wherein the second amplifier is configured to receive the output of the operational amplifier as the single input to the second amplifier and automatically generate a second control signal for the first transistor based on the output of the operational amplifier and a pre-defined function, wherein the pre-defined function is based on a voltage headroom associated with the first current path.

2. The circuit of claim 1, wherein the third pin is configured to be connected to a sense resistor, wherein the sensed current is determined based on a voltage drop over the sense resistor.

3. The circuit of claim 1, wherein:
the first transistor in the first current path is configured to control delivery of the first current via the first current path to the plurality of LEDs via the first LED pin; and
the second transistor in the second current path is configured to control delivery of the second current via the second current path to the subset of the plurality of LEDs via the second LED pin.

4. The circuit of claim 1, wherein the pre-defined function is based on whether the first LED pin receives enough voltage for the voltage headroom associated with the first current path to drive the plurality of LEDs.

5. The circuit of claim 4, wherein:
in a first situation, the first current is equal to the sensed current and the second current is approximately zero; and
in a second situation, the first current and the second current are both non-zero and collectively sum to the sensed current.

6. The circuit of claim 5, wherein the second situation corresponds to a lower battery voltage than the first situation, wherein the plurality of LEDs is arranged between a battery and the first and second LED pins.

7. The circuit of claim 4, wherein:
in a third situation, based on the first LED pin having insufficient voltage for the voltage headroom of the first current path to drive the plurality of LEDs, the second current is equal to the sensed current and the first current is approximately zero.

8. The circuit of claim 1, wherein the portion of the plurality of LEDs are arranged in series.

9. The circuit of claim 1, further comprising:
a third LED pin configured to be connected to a subset of the subset of the plurality of LEDs, wherein the subset of the subset comprises a sub-portion of the portion of the plurality of LEDs, wherein the sub-portion of the portion of the plurality of LEDs are arranged in series, and
wherein the sum corresponds to the first current and the second current and a third current through the third LED pin.

10. The circuit of claim 9, further comprising:
N LED pins configured to be connected to different sets of the plurality of LEDs, wherein N is a positive integer greater than 3, wherein LEDs in each of the different sets are arranged in series, and
wherein the sum corresponds to all currents associated with each of the N LED pins.

11. The circuit of claim 1, wherein the first supply side corresponds to a battery side and the plurality of LEDs are arranged between a battery and the first and second LED pins, and wherein the second supply side corresponds to a ground side and a sense resistor is arranged between a ground and the third pin.

12. A system comprising:
a plurality of light emitting diodes (LEDs) arranged in series;
a sense resistor; and
a circuit configured to deliver current to the plurality of LEDs, the circuit comprising:
a first LED pin on a first supply side of the circuit, wherein the first LED pin is connected to the plurality of LEDs;
a second LED pin on the first supply side of the circuit, wherein the second LED pin is connected to a subset of the plurality of LEDs, wherein the subset comprises a portion of the plurality of LEDs and wherein the portion is arranged in series; and
a third pin on a second supply side of the circuit, wherein the third pin is connected to the sense resistor,
wherein the circuit is configured to:
deliver a first current to the plurality of LEDs through the first LED pin and over a first current path through the circuit, wherein the first current path includes a first transistor; and
deliver a second current to the subset of the plurality of LEDs through the second LED pin and over a second current path through the circuit, wherein the second current path includes a second transistor, wherein the second current path is in parallel with the first current path in the circuit, wherein a sum of the first current and the second current is regulated based on a sensed current through the circuit, and wherein the sense resistor is configured to measure the sensed current,
wherein regulation of the first current path and the second current path comprises a single regulation loop by the circuit, wherein to perform the single regulation loop, the circuit includes:
an operational amplifier configured to generate a main control signal for regulating both the first current path and the second current path based on the sensed current and a voltage reference signal, wherein the main control signal defines a first control signal for the second transistor; and
a second amplifier that includes a single input connected to an output of the operational amplifier, wherein the second amplifier is configured to receive the output of the operational amplifier as the single input to the second amplifier and automatically generate a second control signal for the first transistor based on the output of the operational amplifier and a pre-defined function, wherein the pre-defined function is based on a voltage headroom associated with the first current path.

13. The system of claim 12, wherein the circuit is configured automatically define the first current and the second current based on the pre-defined function, wherein the pre-defined function is based on whether the first LED pin receives enough voltage for the voltage headroom associated with the first current path to drive the plurality of LEDs, and wherein:
in a first situation, the first current is equal to the sensed current and the second current is approximately zero;
in a second situation, the first current and the second current are both non-zero and collectively sum to the sensed current; and
in a third situation, based on the first LED pin having insufficient voltage for the voltage headroom of the first current path to drive the plurality of LEDs, the second current is equal to the sensed current and the first current is approximately zero.

14. A method of operating a circuit for delivering current to a plurality of light emitting diodes (LEDs) arranged in series, the method comprising:
delivering a first current to the plurality of LEDs through a first LED pin and over a first current path through the circuit, wherein the first current path includes a first transistor;
delivering a second current to a subset of the plurality of LEDs through a second LED pin and over a second current path through the circuit, wherein the second current path includes a second transistor; and
regulating a sum of the first current and the second current, wherein the second current path is in parallel with the first current path in the circuit, and wherein the sum of the first current and the second current is regulated based on a sensed current through the circuit,
wherein regulating the sum of the first current and the second current comprises a single regulation loop by the circuit, wherein to perform the single regulation loop, the circuit includes:
an operational amplifier that generates a main control signal for regulating both the first current path and the second current path based on the sensed current and a voltage reference signal, wherein the main control signal defines a first control signal for the second transistor; and
a second amplifier that includes a single input connected to an output of the operational amplifier, wherein the second amplifier receives the output of the operational amplifier as the single input to the second amplifier and automatically generates a second control signal for the first transistor based on the output of the operational amplifier and a pre-defined function, wherein the pre-defined function is based on a voltage headroom associated with the first current path.

15. The method of claim 14, wherein:
in a first situation, the first current is equal to the sensed current and the second current is approximately zero;

in a second situation, the first current and the second current are both non-zero and collectively sum to the sensed current; and in a third situation, based on the first LED pin having insufficient voltage for the voltage headroom of the first current path to drive the plurality of LEDs, the second current is equal to the sensed current and the first current is approximately zero.

\* \* \* \* \*